United States Patent [19]

Carr et al.

[11] Patent Number: 4,738,695

[45] Date of Patent: Apr. 19, 1988

[54] GAS REMOVAL SYSTEM

[75] Inventors: Ivan H. Carr; James W. Hayman, both of Miami, Fla.; Ralph E. Roper, Jr., Carmel, Ind.

[73] Assignee: Dade County Aviation Dept., an Administrative Division of Metropolitan, Dade County, Fla.

[21] Appl. No.: 60,342

[22] Filed: Jun. 10, 1987

[51] Int. Cl.[4] .............................................. B01D 53/14
[52] U.S. Cl. .......................................... 55/84; 55/89; 55/229; 261/DIG. 75; 261/16; 261/113
[58] Field of Search ................. 55/68, 23, 84, 89, 228, 55/229, DIG.20; 261/DIG. 75, 16, 113

[56] References Cited

U.S. PATENT DOCUMENTS

| | | |
|---|---|---|
| 77,002 | 12/1904 | Clements et al. . |
| 3,667,193 | 6/1972 | McKenzie .................. 55/229 X |
| 3,704,570 | 12/1972 | Mordenier .................. 55/84 |
| 3,706,538 | 12/1972 | Chew . |
| 3,731,459 | 5/1973 | Faster ........................ 55/94 |
| 4,308,138 | 12/1981 | Wolfman ............. 261/DIG. 75 X |
| 4,469,493 | 9/1984 | Tuovinen et al. ............. 55/89 |
| 4,624,626 | 11/1986 | Sherfinski et al. . |

Primary Examiner—Charles Hart
Attorney, Agent, or Firm—Finnegan, Henderson, Farabow, Garrett & Dunner

[57] ABSTRACT

A portable gas removal system for withdrawing a flammable gas from a low pressure subterranean formation wherein the gas is aspirated from a well with water, the mixture of gas and water are introduced into a receiving chamber where the aspirated gas is stripped and mixed with air and an air-gas mixture is withdrawn having a gas concentration lower than the explosive limit.

13 Claims, 1 Drawing Sheet

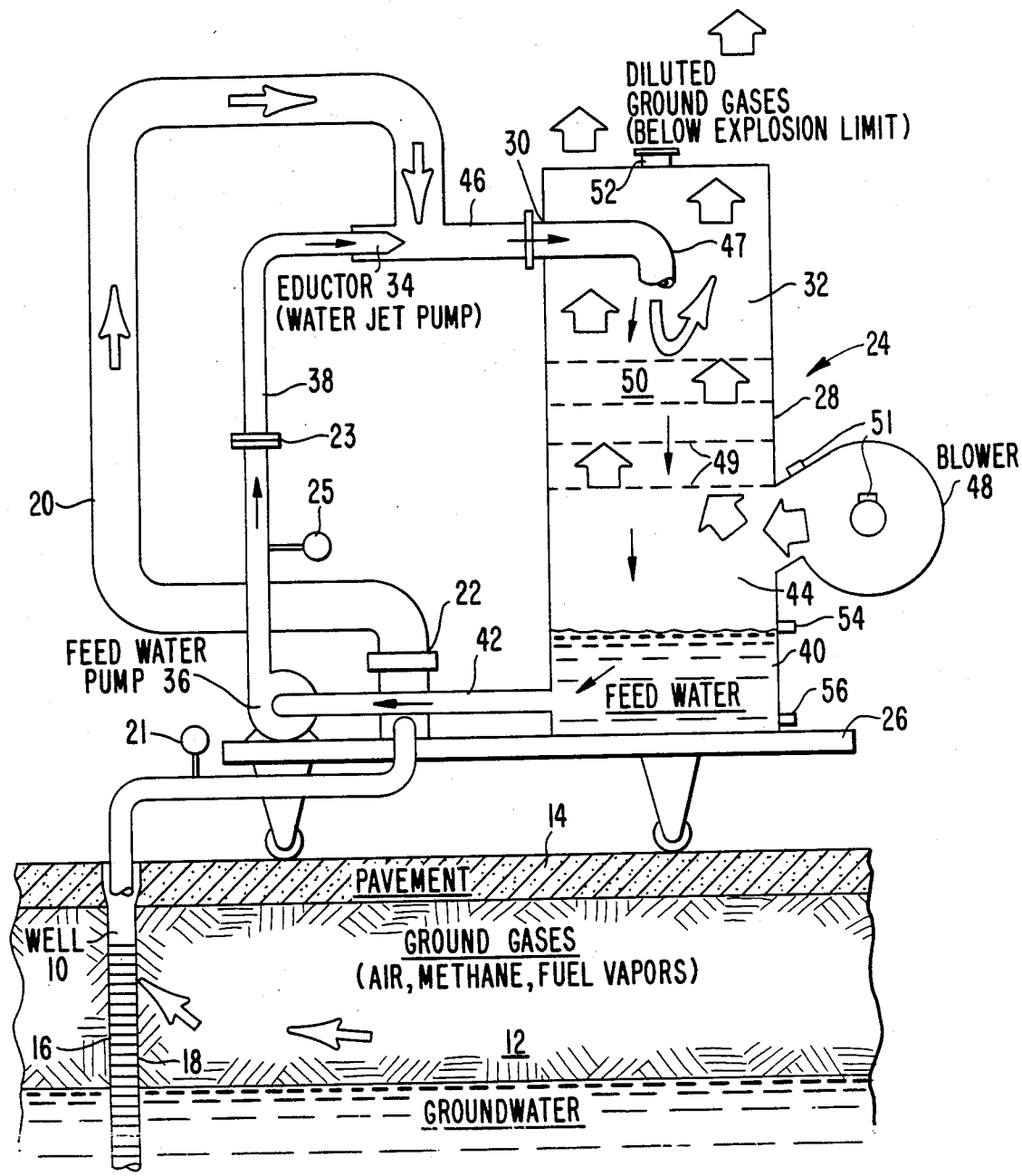

GAS REMOVAL SYSTEM

BACKGROUND OF THE INVENTION

This invention relates to a method and apparatus for removing and treating a gas, particularly a flammable gas, from a low pressure gas source. Still more particularly it relates to such a method and apparatus for removing a gaseous hydrocarbon, such as methane, from a subterranean formation to provide a nonexplosive mixture of the gas and air for disposal.

Gaseous hydrocarbons occur in subterranean formations and may be formed as the result of degradation of heavier hydrocarbons, coal or other organic materials. These hydrocarbon gases can migrate to the earth's surface through porous subterranean formations such as limestone, sandstone, sand or the like. Oftentimes, the combination of the formation pressure, the rate of migration and the quantity of escaping gas is such that commercial recovery of the gas is not feasible. In a low pressure formation not sealed by an impermeable barrier the formation pressure may be slightly higher than atmosphere pressure while still being low enough that the gas does not readily escape to the atmosphere. Nevertheless, a fire or explosive hazard may be present even when there is a low flow rate of gas from a low pressure formation and the escaping gas mixes with air in the atmosphere.

The above problem is of particular concern when it occurs in populated areas, or in the vicinity of other flammable materials, such as airports, petroleum refineries, oil storage facilities or the like. Therefore, it is desirable in such instances to remove the hydrocarbons in a controlled manner for safe disposal to reduce such hazards.

It is well known that certain mixtures of hydrocarbon gases and air are either flammable or explosive, depending upon the concentration of the particular gas in the air. For example, it is known that such a mixture containing above 15 volume percent methane in air will sustain combustion, and that between 5 and 15 percent volume percent methane, the mixture is explosive. Below 5 volume percent methane in air, the mixture is non-flammable and non-explosive.

It is also known to use venturi type devices for removing gases from water wells. Further, it is known to use a venturi arrangement in combination with a mixing chamber and air blower for cleaning discharge gases of particulates and the like. For example, smoke abatement apparatus has been disclosed wherein smoke is aspirated by a wetting fluid in a venturi where it is scrubbed and passed into a tank where emulsified materials from the smoke are collected.

However, such prior art apparatus is not satisfactory for aspirating gas from a low pressure source of gas, for example, methane from a low pressure subterranean formation, and emitting therefrom a non-explosive mixture of the gas in air. Nor is such apparatus self-contained and portable, while being reliable, safe and simple to operate and, further, economic to build and operate.

SUMMARY OF THE INVENTION

It is an object of the present invention to provide a method and apparatus for removing an undesirable gas from a low pressure gas source, i.e., a source under a pressure near atmospheric and disposing of the gas in a safe and reliable manner. It is a further object of this invention to provide such apparatus which is simple to install and operate and which can readily be moved from one location to another for use.

Additional objects and advantages of the present invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of withdrawing a gas from a gas source comprises: (a) establishing flow communication between the gas source and an aspirating zone; (b) aspirating the gas from the gas source with a liquid aspirating agent supplied under high pressure to the aspirating zone; (c) introducing the aspirated gas and the aspirating agent into an upper portion of a receiving chamber; (d) introducing a diluent gas under pressure into a lower portion of the receiving chamber so that the diluent gas contacts the aspirated gas and aspirating agent in a contacting zone therein; (e) collecting the contacted aspirating agent in a reservoir (f) recycling the collected aspirating agent to the aspirating zone; and (g) withdrawing a mixture of diluent gas and aspirated gas, after said contacting, from the receiving chamber.

When it is desired to remove a hydrocarbon gas, for example, methane from a subterranean formation, it is preferred to use water as the aspirating agent and air as the diluent gas.

Advantageously, the pressure and flow rate of each of the water and the air are correlated relative to the rate at which the hydrocarbon gas is aspirated to maintain a concentration of the hydrocarbon gas in the withdrawn mixture of gases at less than the explosive limit.

According to the present invention, there is provided apparatus for removing gas from a low pressure gas source comprising: (a) an intake conduit connected to the gas source; (b) aspirator means connected to the intake conduit for aspirating gas from the source; (c) means for supplying an aspirating fluid under pressure to the aspirator means; (d) a chamber connected to the aspirator means and the intake conduit for receiving the aspirating fluid and aspirated gas, the chamber having an upper zone and a lower zone; (e) a conduit for introducing the aspirating fluid and the aspirated gas into the upper zone of the chamber; (f) means for introducing a diluent gas into the lower zone of the chamber; (g) reservoir means positioned below the lower zone for collecting the aspirating fluid introduced into the chamber; (h) a recycle conduit connecting the reservoir means to the means for supplying aspirating fluid; and (i) vent means in the chamber above the upper zone for withdrawing a mixture of the aspirated gas and the diluent gas therefrom.

BRIEF DESCRIPTION OF THE DRAWING

The accompanying drawing, which is incorporated in and constitutes a part of the specification, illustrates one embodiment of the invention and, together with the description, serves to explain the principles of the invention. The drawing is a schematic elevation showing a preferred embodiment of apparatus according to the present invention for withdrawing and disposing of gas from a well.

DETAILED DESCRIPTION OF THE INVENTION

Reference will now be made to a preferred embodiment of the invention as installed at a location where ground gases, including air, methane, hydrocarbon fuel vapors and the like are trapped in a porous, low pressure limestone subterranean formation between underlying ground water and concrete pavement installed on the surface of the earth. Such ground gases tend to migrate through the porous limestone toward the surface of the earth and escape through openings in the pavement into the atmosphere. The migration rate of the ground gases escaping to the atmosphere can be rather slow at times, but the pumping action of rising and falling ground water can accelerate the rate of escape. The concentration level of methane in the escaping gases was determined to be as high as 70% by volume over an area of several acres, and, depending upon location, the methane concentration may range from a few percent up to approximately 50% or more by volume. Thus, the escaping gases may be flammable or explosive, depending upon the concentration of methane in the air.

The drawing shows a schematic representation of a preferred embodiment of the invention, wherein a well 10 is drilled into a limestone formation 12 through an apron pavement 14 and the well 10 is cased with a pipe 16 extending from a suitable depth to the surface of the pavement 14. Perforations 18 in casing 16 permit migrating ground gases to enter the well 10 and rise through the casing from the earth.

An intake conduit 20 is connected to the top of casing 16 by a suitable fitting (not shown) which may be a flanged or screwed connection or a slip joint, as desired. A flame trap 22, or flame arrestor, is located in intake conduit 20 near the top of well 10, as a precaution in the event of a fire or explosion at the unit, to prevent the fire or explosion from traveling down the well to the subsurface. A suitable flame trap is a PFT Model No. 91 made by IEVIREX Co.

The gas removal unit, generally designated as 24, is mounted on a wheeled cart 26; however, another similar support structure permitting portability of the unit may be used. The cart 26 and all components of the gas removal unit 24 should be of a spark resistant material, to the greatest practical degree. Especially the larger components are preferably made of a material such as aluminum, providing lightweight as well as spark resistance. Also, all electric motors, switches and wiring should be explosion proof. As will be seen, the withdrawn gas passes through no moving assemblies, to further enhance the safety of the operation.

Intake conduit 20 is connected to an aspirating means for aspirating gas from the well 10. The aspirating means includes an eductor 34 positioned in intake conduit 20, preferably by a Tee as shown in the drawing. A means for supplying aspirating fluid, including a centrifual feed water pump 36, driven by an electric motor (not shown), is connected to eductor 34 by conduit 38 to supply water or other suitable aspirating fluid under high pressure to eductor 34.

Eductor 34 may be a conventional type eductor and serves as a water jet pump to aspirate ground gases from well 10 by creating a suction in intake conduit 20. For example, the eductor may be a Penberthy Model FL51 water jet pump manufactured by the Penberthy Division of Houdaille Industries. Eductor 34 is arranged in intake conduit 20 to provide a suitable constriction therein to produce a venturi effect when supplied with high pressure water and thereby create a negative pressure, i.e., less than atmospheric pressure, in intake conduit 20 so that the low pressure ground gases are aspirated from the well.

A reservoir 40 is provided for collecting and holding the aspirating fluid and the reservoir 40 is positioned at a level near the bottom of chamber 28. Means for supplying the aspirating fluid includes a feed water pump 36 which is supplied with water from reservoir 40 through a recycle conduit 42 connecting the pump 36 and the reservoir 40. A flow meter 23 and a pressure gauge 25 are used to measure the flow rate and pressure of water supplied to the eductor 34.

Initially, reservoir 40 is filled with a desired quantity of water through a fill line 54 to provide sufficient water for circulation in the unit. Additional make-up water may be added from time to time to compensate for evaporation losses occurring during operation of the unit. Otherwise, the water circulation system is enclosed and self-contained. A drain line 56 may be used to drain water, etc., from the unit.

Reservoir 40 is located below a lower zone 44 in a chamber 28 to collect water introduced into chamber 28 by eductor 34. Reservoir 40 may be located in the bottom of chamber 28 as shown, or it may be a separate vessel arranged on a second cart to provide lighter weight individual carts for ease of portability.

The formation pressure of the porous limestone or the like containing the ground gases typically is close to atmospheric pressure, but not great enough for the ground gases to readily escape. When water pump 36 delivers water under pressure to eductor 34 a suction is created on well 10. A vacuum gauge 21 may be used to measure a negative pressure, or vacuum, which is created in intake conduit 20 so that gases can be drawn from well 10.

Gas withdrawn from the well, along with water from the eductor, is passed by a conduit 46 connected to an inlet opening 30 located in an upper zone 32 near the top of a receiving chamber 28. The water and gas are directed downwardly into upper zone 32 of chamber 28 by the elbow 47 forming the outlet of conduit 46.

There is provided a means for introducing a diluent gas into the chamber. Such means includes an air blower 48 connected to chamber 28 near the bottom thereof to introduce air into a lower zone 44 of the chamber. Typically from about 500 to about 600 CFM of fresh air is blown into chamber 28 and moves upwardly in the chamber to counter-currently contact the incoming water and withdrawn gas in contacting zone 50 located intermediate upper zone 32 and lower zone 44. If desired, one or more baffles 49, contacting trays or a tower packing such as a mesh, raschig rings, saddles or the like may be installed in chamber 28 as an aid in contacting the withdrawn gas and water with air blown into the chamber. As the air moves upwardly in the chamber, it disperses the free gas to a concentration below the lower explosive limit of the gas, it strips dissolved methane from the water and it further cools the water and maintains a relatively constant temperature within chamber 28.

The pressure within chamber 28 is typically slightly above atmospheric pressure and the introduced air and stripped gases move upwardly through the chamber and are removed therefrom through vent 52 located in the top of the chamber. Since the concentration of methane in the air emitted from a vent 52 is maintained at a level lower than the explosive limit, the gases may be released to the atmosphere with safety, or, if desired, they may be conveyed away from the unit through a conduit (not shown) connected to vent 52 for disposal.

Advantageously, both mechanical and electrical interlocks are employed so that the eductor 34 may not draw gases from the well unless the air blower 48 is operating, to provide a fail-safe operation. For example, a differential pressure switch 51 may be used to sense the difference in pressure between the intake and exhaust of the air blower 48. If there is not sufficient pressure differential the switch 51 will shut off water pump 36.

In the practice of the present invention, the flow rate of the methane is not determining. However, it is important that the flow rate of air blown into chamber 28 is correlated with the flow rate of methane aspirated from the well so that the gases emerging from vent 52 have a hydrocarbon gas concentration which is at a level lower than the explosive limit for the gas. For example, in the case of methane, the methane concentration should be maintained at a level of less than 5 volume percent, and preferably, at a level not greater than 50% of the lower explosive limit, i.e., less than 2.5 volume percent.

Typically, with a formation pressure approximately at atmospheric, when about 10 gpm of water was supplied to eductor 34 under a pressure of about 28 p.s.i.g., a vacuum of between about 3 and about 6 inches of water was created in intake conduit 20 so that from about 20 to about 25 cfm of well-gas was aspirated from well 10 of which up to 70% or about 17 cfm was methane. When about 600 cfm of air was blown into chamber 28, the gases exiting from vent 52 contained not more than about 2.5% by volume of methane.

Typically, from about 10 to about 15 gpm of water may be supplied to eductor 34 rendering a pressure between about 20 and 40 p.s.i.g., a vacuum of between about 0 and about 20 inches of water is created in intake conduit 20 and from about 20 to about 35 cfm of well gas is aspirated. A suitable quantity of air, typically from about 250 to about 750 cfm depending upon the amount of hydrocarbon gas, is blown into chamber 28 so that the exit gases are not explosive.

The above-described gas removal unit may be used continuously at a given location for removing ground gases or, if desired, it may be moved from one location to another for removing or monitoring the flow of ground gases.

Having described a preferred embodiment of the present invention, variations and modifications thereof, will become apparent to those skilled in the art without departing from the scope of the appended claims. Thus it is intended that the present invention cover such modifications and variations provided they fall within the scope of the appended claims and their equivalents.

What is claimed is:

1. A method of withdrawing a gas from a low pressure gas source comprising:
   (a) establishing flow communication between said gas source and an aspirating zone;
   (b) aspirating said gas from said gas source with a liquid aspirating agent supplied under high pressure to said aspirating zone;
   (c) introducing said aspirated gas and said aspirating agent into an upper portion of a receiving chamber;
   (d) introducing a diluent gas under pressure into a lower portion of said receiving chamber so that said diluent gas contacts said aspirated gas and aspirating agent in a contacting zone therein;
   (e) collecting said contacted aspirating agent in a reservoir;
   (f) recycling said collected aspirating agent to said aspirating zone; and
   (g) withdrawing a mixture of said diluent gas and said aspirated gas, after said contacting, from said receiving chamber.

2. The method of claim 1, wherein said gas source is a subterranean formation and said gas comprises a hydrocarbon gas.

3. The method of claim 2, wherein said aspirating agent is water and said diluent gas is air.

4. The method of claim 3, wherein the pressure and flow rate of each of said water and said air are correlated relative to the rate at which said hydrocarbon gas is aspirated to maintain a concentration of said hydrocarbon gas in said withdrawn mixture of gases at less than the explosive limit.

5. The method of claim 4, wherein said hydrocarbon gas comprises methane which is aspirated at a rate of between about 10 and about 35 CFM, said water is supplied to said aspirating zone at a flow rate between about 10 and about 15 gpm and a pressure between about 20 and about 40 psig, and between about 250 and about 750 CFM of air is blown upwardly into said chamber.

6. The method of claim 2, wherein gas is aspirated from said formation under a vacuum between about 0 and about 20 inches of water.

7. Apparatus for removing gas from a low pressure gas source comprising:
   (a) an intake conduit connected to said gas source;
   (b) aspirator means connected to said intake conduit for aspirating gas from said source;
   (c) means for supplying an aspirating fluid under pressure to said aspirator means;
   (d) a chamber connected to said aspirator means and said intake conduit for receiving said aspirating fluid and aspirated gas, said chamber having an upper zone and a lower zone;
   (e) a conduit for introducing said aspirating fluid and said aspirated gas into said upper zone of said chamber;
   (f) means for introducing a diluent gas into said lower zone of said chamber;
   (g) a reservoir positioned below said lower zone for collecting said aspirating fluid introduced into said chamber;
   (h) a recycle conduit connecting said reservoir means to said supply means for supplying aspirating fluid thereto; and
   (i) a vent in said chamber for withdrawing a mixture of said aspirated gas and said diluent gas therefrom.

8. The apparatus of claim 7, wherein said aspirator means comprises a water jet pump and said means for supplying an aspirating fluid comprises a centrifugal pump connected to said water jet pump.

9. The apparatus of claim 8, wherein said means for introducing said diluent gas comprises an air blower connected to said lower zone.

10. The apparatus of claim 7, wherein said reservoir is positioned in said chamber below the level at which said diluent gas is introduced into said chamber, and said vent is positioned in said chamber above said conduit for introducing said aspirating agent and said aspirated gas into said chamber.

11. The apparatus of claim 7, including a flame arrestor located in said intake conduit 12. The apparatus of claim 9, further comprising a differential switch for sensing the pressure differential between the intake and the exhaust of said air blower, and wherein and said means for supplying an aspirating fluid comprises a centrifugal pump, said differential switch being connected to said pump and adapted to shut off said pump unless a sufficient pressure differential is sensed by said switch.

13. The apparatus of claim 9, further including a wheeled cart supporting at least said chamber, said centrifugal pump and said air blower.

* * * * *